US009857081B2

United States Patent
Collmer et al.

(10) Patent No.: US 9,857,081 B2
(45) Date of Patent: Jan. 2, 2018

(54) BOTTOM ASSEMBLY UNIT FOR A COMBUSTION CHAMBER ASSEMBLY UNIT OF A VAPORIZING BURNER

(71) Applicant: Eberspächer Climate Control Systems GmbH & Co. KG, Esslingen (DE)

(72) Inventors: Andreas Collmer, Aichwald (DE); Axel Kouril, Salach (DE); Uwe Grotstollen, Esslingen (DE); Lars Bendix, Schorndorf-Weiler (DE); Oliver Roppelt, Deizisau (DE); Marcus Heim, Kornwestheim (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 538 days.

(21) Appl. No.: 14/511,447

(22) Filed: Oct. 10, 2014

(65) Prior Publication Data

US 2015/0102115 A1    Apr. 16, 2015

(30) Foreign Application Priority Data

Oct. 14, 2013    (DE) ........................ 10 2013 220 654

(51) Int. Cl.
     *F23D 3/40*        (2006.01)
     *F24C 5/02*        (2006.01)
     (Continued)

(52) U.S. Cl.
     CPC .............. *F24C 5/02* (2013.01); *B60H 1/2212* (2013.01); *F23D 3/40* (2013.01)

(58) Field of Classification Search
     CPC . F24C 5/02; F24C 5/04; B60H 1/2212; B60H 1/2203; F23D 3/40; F23D 11/448; F23D 11/46; F24H 9/1881; F23K 5/22
     (Continued)

(56) References Cited

U.S. PATENT DOCUMENTS 3,849,055 A * 11/1974 Stanley ................ F23D 5/00
                                                         431/170
4,230,443 A * 10/1980 Berg ................... F02M 27/02
                                                         431/115
(Continued)

FOREIGN PATENT DOCUMENTS

| CN | 101142016 A | 3/2008 |
|---|---|---|
| CN | 102200279 A | 9/2011 |

(Continued)

OTHER PUBLICATIONS

"CN_102200279_B—Machine Translation.pdf", machine translation, EPO.org, Mar. 6, 2017.*

(Continued)

*Primary Examiner* — Gregory Huson
*Assistant Examiner* — Daniel E Namay
(74) *Attorney, Agent, or Firm* — McGlew and Tuttle, P.C.

(57) ABSTRACT

A vaporizing burner combustion chamber assembly unit, especially for a vehicle heater, includes a bottom part (32) with a bottom wall (34) and with a first circumferential wall (38) and a porous evaporator medium (42) at least partially covering a front side of the bottom wall, which is to face a combustion chamber (14). A ring-shaped holding part has a second circumferential wall (54) and a contact area (56) touching the porous evaporator medium. The first circumferential wall extends, from an outer edge area (36) of the bottom wall essentially in a longitudinal axis (L) direction of a bottom assembly unit (30), on a rear side of the first bottom wall facing away from a combustion chamber, in the direction away from the porous evaporator medium. The second circumferential wall extends at least partially over the first circumferential wall on its outer side and is fixed to same.

20 Claims, 4 Drawing Sheets

(51) Int. Cl.
*B60H 1/22* (2006.01)
*F23D 11/44* (2006.01)
*F23D 5/10* (2006.01)
*F23K 5/22* (2006.01)

(58) Field of Classification Search
USPC .................. 237/12.3 C; 431/7, 170, 326
See application file for complete search history.

(56) References Cited

U.S. PATENT DOCUMENTS

| | | | | | |
|---|---|---|---|---|---|
| 4,365,952 | A * | 12/1982 | Ohmukai | .................. | F23D 3/40 239/138 |
| 4,421,476 | A * | 12/1983 | Gulden | .................. | F02M 27/02 239/132.3 |
| 5,000,004 | A * | 3/1991 | Yamanaka | .............. | F23C 13/00 431/7 |
| 5,020,991 | A * | 6/1991 | Schaale | ..................... | F23D 3/40 126/110 B |
| 5,056,501 | A * | 10/1991 | Ida | ...................... | B60H 1/2212 126/110 B |
| 5,062,788 | A * | 11/1991 | Best | ......................... | F23D 14/34 431/10 |
| 5,197,871 | A * | 3/1993 | Yamamoto | ........... | F23D 11/441 126/110 B |
| 5,439,372 | A * | 8/1995 | Duret | ...................... | F23D 14/02 431/2 |
| 5,441,402 | A * | 8/1995 | Reuther | .................. | F23D 14/02 431/328 |
| 5,641,282 | A * | 6/1997 | Lee | ......................... | F23D 14/16 126/91 A |
| 5,658,139 | A * | 8/1997 | Flanagan | ............... | F23D 14/74 431/328 |
| 5,938,427 | A * | 8/1999 | Suzuki | ...................... | F23C 6/04 431/11 |
| 5,993,192 | A * | 11/1999 | Schmidt | .................. | F23D 14/18 431/12 |
| 6,431,857 | B1 * | 8/2002 | Charmes | ................. | F23D 14/18 431/326 |
| 6,761,558 | B1 * | 7/2004 | Kim | ...................... | F23D 14/125 126/91 R |
| 6,991,454 | B2 * | 1/2006 | Gore | ...................... | F23D 14/16 126/92 R |
| 7,157,066 | B2 * | 1/2007 | Diener | .................. | B82Y 30/00 423/445 B |
| 7,578,669 | B2 * | 8/2009 | Liu | ......................... | F23C 13/06 122/367.1 |
| 2001/0035463 | A1 * | 11/2001 | Takagi | ..................... | F23D 3/40 237/12 |
| 2002/0132205 | A1 * | 9/2002 | Gore | ...................... | F23D 14/16 431/328 |
| 2003/0022118 | A1 * | 1/2003 | Suzuki | .................... | F23C 13/02 431/243 |
| 2003/0027090 | A1 * | 2/2003 | Blaschke | ................ | B01B 1/005 431/243 |
| 2003/0196381 | A1 * | 10/2003 | Eberspach | ............. | B01B 1/005 48/197 FM |
| 2004/0173692 | A1 | 9/2004 | Blaschke et al. | | |
| 2005/0136305 | A1 * | 6/2005 | Eberspach | ................ | F23D 3/40 429/435 |
| 2008/0124666 | A1 * | 5/2008 | Stocker | ................. | F23C 99/006 431/7 |
| 2008/0134580 | A1 | 6/2008 | Kah et al. | | |
| 2008/0141675 | A1 * | 6/2008 | Liu | ......................... | F23C 13/06 60/777 |
| 2014/0000551 | A1 * | 1/2014 | Eberspach | ............. | F02B 19/00 123/253 |
| 2014/0193759 | A1 * | 7/2014 | Weber | ...................... | F23C 7/06 431/314 |
| 2014/0234792 | A1 * | 8/2014 | Brehmer | .................. | F23D 3/40 431/329 |
| 2014/0346242 | A1 * | 11/2014 | Jozinovic | ................ | F23C 7/004 237/32 |
| 2015/0102117 | A1 * | 4/2015 | Collmer | ............... | B60H 1/2203 237/12.3 C |

FOREIGN PATENT DOCUMENTS

| | | | | |
|---|---|---|---|---|
| DE | 4401799 C1 * | 6/1995 | .............. | F23D 3/40 |
| DE | 102005004359 A1 * | 8/2006 | .............. | F23D 3/40 |
| DE | 10 2005 032 980 A1 | 1/2007 | | |
| DE | EP 1744100 A2 * | 1/2007 | .............. | F23D 3/40 |
| DE | EP 1970624 A2 * | 9/2008 | .............. | F23D 3/40 |
| EP | 1275901 A2 | 1/2003 | | |
| EP | 1696174 A1 | 8/2006 | | |
| EP | 1744100 A2 | 1/2007 | | |
| JP | 02033522 A * | 2/1990 | .............. | F23D 3/40 |

OTHER PUBLICATIONS

"Google Translate DE-102005032980.pdf", machine translation, google.com, Mar. 6, 2017.*

* cited by examiner

Fig. 1

BOTTOM ASSEMBLY UNIT FOR A COMBUSTION CHAMBER ASSEMBLY UNIT OF A VAPORIZING BURNER

CROSS REFERENCE TO RELATED APPLICATIONS

This application claims the benefit of priority under 35 U.S.C. §119 of Germany Patent DE 10 2013 220 654.2 filed Oct. 14, 2013, the entire contents of which are incorporated herein by reference.

FIELD OF THE INVENTION

The present invention pertains to a bottom assembly unit for a combustion chamber assembly unit of a vaporizing burner, especially for a vehicle heater, comprising a bottom part with a first bottom wall and with a first circumferential wall extending from an outer edge area of the first bottom wall essentially in the direction of a longitudinal axis of the assembly unit and a porous evaporator medium covering the first bottom wall on a front side of the first bottom wall, which said front side is to be positioned such that it faces a combustion chamber.

BACKGROUND OF THE INVENTION

A combustion chamber assembly unit, in which a bottom assembly unit is provided adjacent to an essentially cylindrical combustion chamber circumferential wall, is known from DE 10 2005 032 980 A1. This bottom assembly unit comprises as a central element a bottom part with a bottom wall and with a circumferential wall starting from the bottom wall in the radially outer edge area of said bottom wall. This bottom part thus has a generally pot-like structure, into which a porous evaporator medium is inserted. This means that the circumferential wall of the bottom area radially surrounds the porous evaporator medium, i.e., it extends, starting from the bottom wall, in the direction of the porous evaporator medium or along same. A wall part, which also extends radially over the combustion chamber circumferential wall on the outside and has a radially inwardly projecting flange area supporting axially the bottom part or its circumferential wall, also extends radially over the bottom part on the outside. The bottom part is held in axial contact with this flange area by a securing element provided on the rear side of the bottom part.

SUMMARY OF THE INVENTION

An object of the present invention is to provide a bottom assembly unit for a combustion chamber assembly unit of a vaporizing burner, which has a great variability in design along with simple manufacturability.

This object is accomplished according to the present invention by a bottom assembly unit for a combustion chamber assembly unit of a vaporizing burner, especially for a vehicle heater, comprising a bottom part with a first bottom wall and with a first circumferential wall extending from an outer edge area of the first bottom wall essentially in the direction of a longitudinal axis of the bottom assembly unit, and a porous evaporator medium covering the first bottom wall in at least some areas on a front side of the first bottom wall, which said front side is to be positioned such that it faces a combustion chamber.

This bottom assembly unit is characterized, further, by a ring-shaped first holding part with a second circumferential wall and with a contact area touching the porous evaporator medium, wherein the first circumferential wall extends in the direction away from the porous evaporator medium starting from the first bottom wall on a rear side of the first bottom wall, which said rear side is to be positioned such that it faces away from a combustion chamber, and the second circumferential wall extends over the first circumferential wall at least partially on its outer side and is fixed to same.

The first holding part surrounding or extending radially over the bottom part on the outside may be positioned in relation to the bottom part by axial pushing over said bottom part. The contact area provided at the first holding part is also brought now into contact with the porous evaporator medium. In its interaction with the porous evaporator medium, the first holding part can thus hold the evaporator medium, on the one hand, at the bottom part in a radially outer area thereof. On the other hand, the contact of the contact area with the porous evaporator medium in its radially outer edge area prevents the fuel being delivered forward by the capillary delivery action in the porous evaporator medium from being discharged at the radially outwardly oriented front side and this fuel is prevented from entering and reaching the area of a combustion chamber. Adaptation of the position of the contact area in relation to the first bottom wall and thus an adaptation to porous evaporator media of different thicknesses are thus guaranteed by setting the degree of overlap of the second circumferential wall with the first circumferential wall. It is also possible to achieve adaptation to an intermediate contact element to be positioned possibly between the contact area and the porous evaporator medium, for example, a wick ring or the like, via which the contact area will then be in contact with the evaporator medium. Consequently, contact of the contact area with the porous evaporator medium does not necessarily mean in the sense of the present invention that the contact area itself comes into direct contact with the porous evaporator medium and presses this medium, for example, against the first bottom wall. Rather, this touching may also take place indirectly, i.e., via the intermediary of one or more additional components. Further, it is possible to contact the bottom part and the first holding part in a simple manner in the area of their axially overlapping circumferential walls.

Provisions may be made in one embodiment that has a very simple design and can be generated, for example, by deformation, for the contact area to be provided, in at least some areas, by a curved end area of the second circumferential wall.

The rigid connection between the bottom part and the first holding part can be embodied in a simple manner by the second circumferential wall to be fixed to the first circumferential wall by press fit or/and connection in substance, preferably welding or soldering. Based on the axial overlap, it is possible here to prepare individual welding spots or, for example, even a weld seam of the mutually overlapping circumferential walls, which are essentially also in direct contact with one another, which said weld seam is continuous in the circumferential direction, by laser welding by means of an essentially radially oriented welding laser.

It is proposed in an especially preferred variant of the bottom assembly unit according to the present invention to provide a second holding part on the rear side of the first bottom wall, wherein the second holding part comprises a second bottom wall located axially opposite the first bottom wall and a third circumferential wall extending from a radially outer edge area of the second bottom wall essentially in the direction of the longitudinal axis away from the first bottom wall, wherein the first circumferential wall or/and the second circumferential wall extends axially at least partly over the third circumferential wall on its outer side and is fixed to same, and wherein a first mounting space is formed between the first bottom wall and the second bottom wall.

For example, a heating arrangement may be provided in such a first mounting space generated between the first bottom wall and the second bottom wall. This heating arrangement may be used to increase the rate of evaporation of the fuel contained in the porous evaporator medium by thermal interaction with said porous evaporator medium provided on the other side, i.e., the front side of the first bottom wall, which is especially advantageous during the start phase at comparatively low ambient temperatures. As an alternative or in addition, heat-insulating material, i.e., generally material that has a lower thermal conductivity than the material of which, for example, the bottom part or the second holding part is made, may be provided in such a first mounting space. Heat losses on the rear side of the first bottom wall or of the bottom part can thus be avoided. This is also especially advantageous when a heating arrangement is provided in this first mounting space.

To simplify the design even more or to increase the thermal efficiency of such a heating arrangement, it is proposed that a heating arrangement housing comprises the first bottom wall and the second bottom wall. Due to the fact that the first bottom wall and the second bottom wall themselves form the heating arrangement housing or a substantial part of a heating arrangement housing, it is possible to provide the thermally active system areas of such a heating arrangement, i.e., generally an electrically energizable heating element, without encapsulating same in another housing.

For example, provisions may be made for the heating arrangement to comprise an electrically conductive heating element and, between this and at least one bottom wall of the first bottom wall and the second bottom wall, at least one preferably plate-like layer of electrically insulating material. The provision of an electrically insulating material between an electrically conductive heating element and the first bottom wall or the second bottom wall avoids an electric short-circuit resulting from a direct contact of the electrically conductive heating element, which itself is not or does not have to be surrounded by additional electrically insulating material or encapsulated, with the parts forming the housing.

To minimize the heat losses especially in the direction of the rear side, it is proposed that heat-insulating material be arranged between the electrically conductive heating element and the second bottom wall. Such a heat-insulating material may, of course, also be positioned between an electrically insulating material, which is, for example, plate-like and is arranged between the electrically conductive heating element and the second bottom wall, and the second bottom wall. The heat-insulating material itself may, of course, also possess an electrically insulating property and thus assume the function of the electrically insulating material.

The first circumferential wall or/and the second circumferential wall and the third circumferential wall may also be fixed at each other by press fit or/and connection in substance, preferably welding or soldering. As was described above, the rigid connection by laser welding by means of a welding laser, which is to be oriented essentially radially, is possible here as well.

It is proposed in an especially advantageous variant of the bottom assembly unit according to the present invention that a second holding part be provided on the rear side of the first bottom wall, wherein the second holding part comprises a third bottom wall located axially opposite the second bottom wall and a fourth circumferential wall extending from a radially outer edge area of the third bottom wall away from the second bottom wall essentially in the direction of the longitudinal axis, wherein the first circumferential wall or/and the second circumferential wall or/and the third circumferential wall extends at least partially axially over the fourth circumferential wall on its outer side and is fixed to same, and wherein a second mounting space is formed between the second bottom wall and the third bottom wall.

For example, heat-insulating material may be arranged in such a second mounting space, which follows the first mounting space in the direction away from the first bottom wall. This can lead to an embodiment in which the heating arrangement having, for example, the above-described design is provided in the first mounting space and the heat-insulating material is provided in the second mounting space. Due to the interpositioning of the third wall between the heating arrangement and the heat-insulating material in the second mounting space, thermal load relief of this heat-insulating material is guaranteed in such an embodiment.

The first circumferential wall or/and the second circumferential wall or/and the third circumferential wall may also be fixed to the fourth circumferential wall by press fit or/and connection in substance, preferably welding or soldering.

To feed the porous evaporator medium provided at the bottom part with fuel, provisions may be made for a fuel feed line opening, preferably in a central area, into the first bottom wall, with the fuel feed line preferably passing through an opening in the second bottom wall or/and an opening in the third bottom wall.

It is possible in an especially advantageous manner, especially in case of the above-described design, to design the bottom part or/and the first holding part or/and the second holding part or/and the third holding part as a deep-drawn part. For example, especially steel material, i.e., steel plate, may be selected as the material, which guarantees sufficient thermal and mechanical stability, on the one hand, but can, on the other hand, be brought to the desired shape in a simple manner with the common possibilities available for machining.

It should be noted that the embodiment of one or more of these parts as a deep-drawn part, preferably from steel material, represents an independent aspect of the present invention, which can also be embodied independently from this special embodiment of a bottom assembly unit, even though it can also be used advantageously in the above-described design and also in the design to be described in detail below.

The present invention pertains, further, to a combustion chamber assembly unit for a vaporizing burner, especially for a vehicle heater, comprising a combustion chamber circumferential wall and a bottom assembly unit designed according to the present invention. The combustion chamber circumferential wall is advantageously positioned here such that it extends axially at least partially over the second circumferential wall on its outer side and is fixed to same.

This leads to a design that can be embodied in a modular form, in which the different circumferential walls, i.e., the first circumferential wall of the bottom part, the second circumferential wall of the first holding part, the third circumferential wall of the second holding part, the fourth circumferential wall of the third holding part, as well as the combustion chamber circumferential wall can be positioned each such that they extend one over the other in a nested manner, which offers the possibility of presetting the relative axial position of the different components in a simple manner, adapted to different assembly units, to be positioned thereon or in a respective mounting space. In particular, it is possible to provide the bottom assembly unit first as a module and then to position this module by pushing the first holding part with its second circumferential wall into the circumferential wall and then to connect it rigidly with this.

This rigid connection of the combustion chamber circumferential wall with the second circumferential wall may be embodied by press fit or/and connection in substance, preferably welding or soldering, so that it is also possible here, in principle, to establish a very stable connection, which is also especially sealed tightly against the discharge of combustion waste gases, for example, by a plurality of welding spots or a weld seam extending in the circumferential direction, prepared, for example, by laser welding.

To make it possible to provide the mixture of combustion air and fuel necessary for the combustion in the combustion chamber, a plurality of combustion air inlet openings may be provided in the circumferential wall. Further, the combustion chamber circumferential wall may be designed integrally with a flame tube.

An ignition element designed, in general, for example, as a glow plug, is used to make it possible to ignite the mixture of combustion air and fuel present in a combustion chamber of such a combustion chamber assembly unit. Provisions may be made to this end for an ignition element passage opening to be provided in the combustion chamber circumferential wall, wherein an ignition element holder is provided on the outer side of the combustion chamber circumferential wall for holding an ignition element positioned such that it is protrudes through the ignition element passage opening into the combustion chamber. The ignition element can thus be positioned at the combustion chamber circumferential wall independently from the assembly unit.

In an embodiment that can be achieved with a simple design, the ignition element holder may be fixed to the circumferential wall by connection in substance preferably by welding, soldering or bonding.

To make it possible to use the ignition element, which is, in general, elongated, as efficiently as possible, it is proposed that a part of the ignition element protruding into a combustion chamber surrounded by the combustion chamber circumferential wall extend essentially in parallel to a side of the porous evaporator medium facing the combustion chamber.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
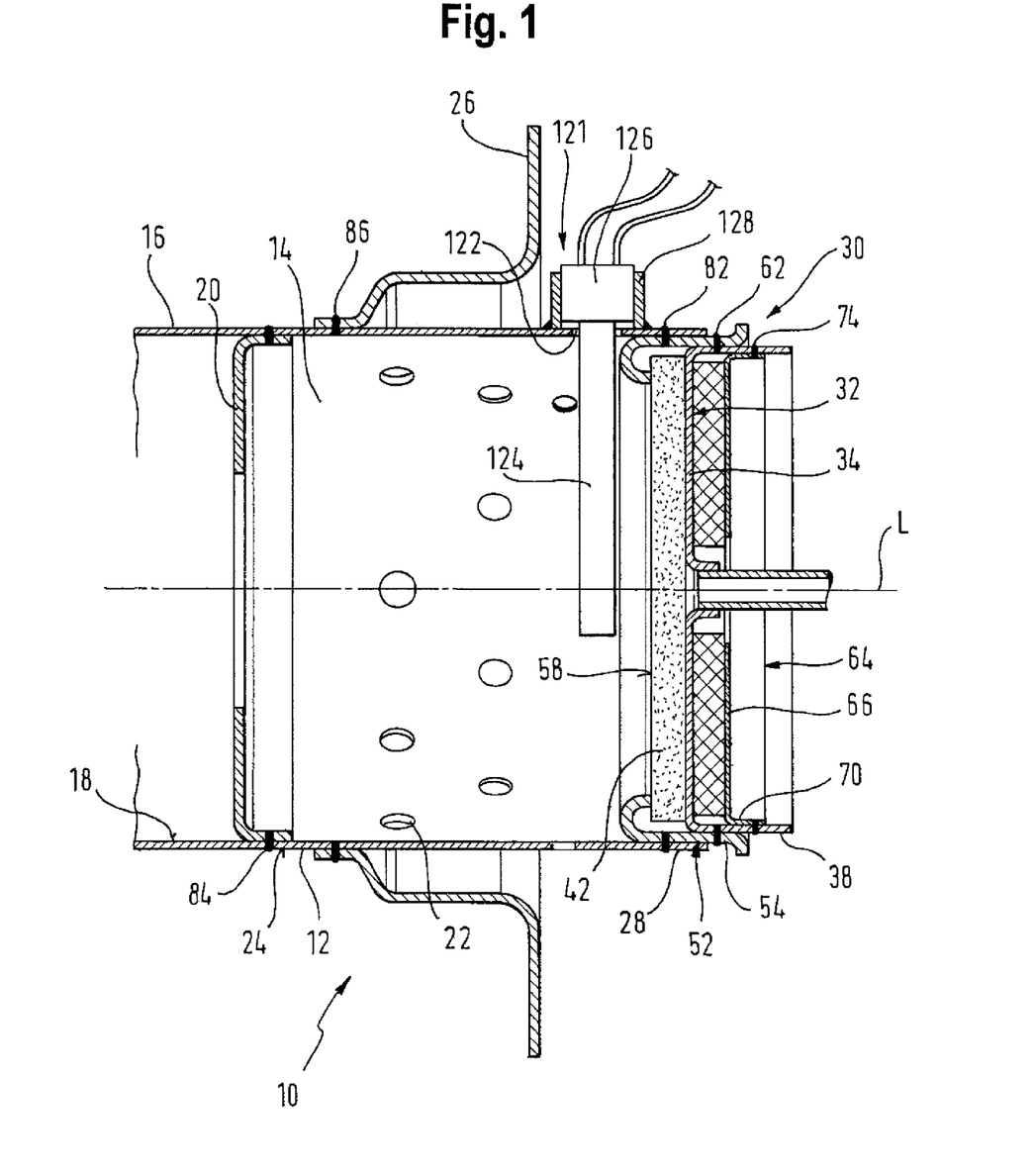
FIG. 1 is a partial longitudinal sectional view of a combustion chamber assembly unit for a vaporizing burner, for example, of a vehicle heater.

Referring to the drawings in particular, a combustion chamber assembly unit is generally designated by 10 in FIG. 1. The combustion chamber assembly unit, which can be used, for example, in a vaporizing burner, comprises an essentially cylindrical combustion chamber circumferential wall 12, which is formed from sheet metal material, for example, steel plate and which surrounds a combustion chamber 14 in a longitudinal area. Adjacent to the combustion chamber 14, the combustion chamber circumferential wall 12 passes integrally over into a flame tube 16, and a flame diaphragm 20 may be fixed in this transition area on an inner side 18 of the combustion chamber circumferential wall 12 or flame tube 16, e.g., by welding. To make it possible to send combustion air into the combustion chamber 14, a plurality of combustion air inlet openings 22 distributed, for example, in the circumferential direction about a longitudinal axis L of the combustion chamber assembly unit 10 are provided at the combustion chamber circumferential wall 12. Further, a mounting flange 26 connected rigidly with the combustion chamber circumferential wall 12, for example, by welding, may be provided on an outer side 24 of the combustion chamber circumferential wall 12. This flange may likewise be manufactured preferably from sheet metal material, e.g., steel plate, for example, by deep drawing, and used to fix the combustion chamber assembly unit 10 in a heater.

Figure 2:
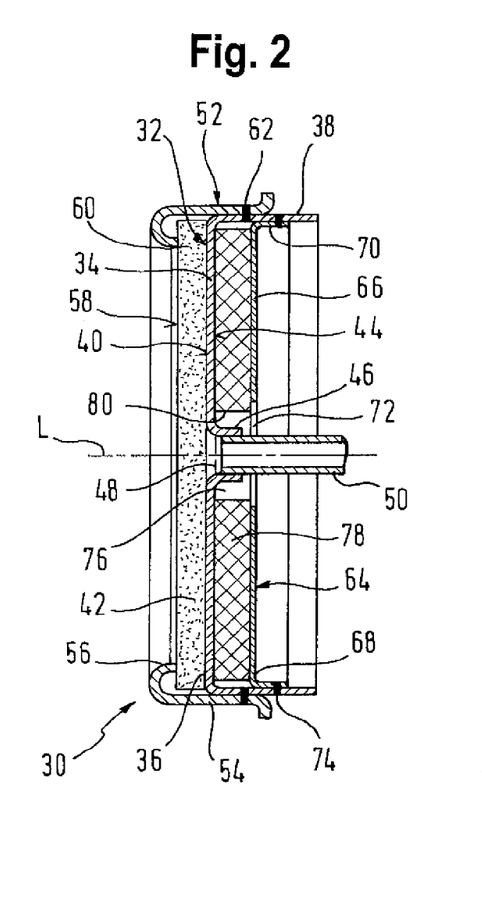
FIG. 2 is a bottom assembly unit of the combustion chamber assembly unit according to FIG. 1 in a longitudinal section.

A bottom assembly unit 30 described in detail below with reference to FIG. 2 is provided or fixed to an axial end area 28 of the combustion chamber circumferential wall 12. This bottom assembly unit 30 comprises as its central component a bottom part 32 with a generally pot-like shape, which is, for example, essentially rotationally symmetrical to the longitudinal axis L. The bottom part 32 comprises a first bottom wall 34 and a first circumferential wall 38 adjacent to the first bottom wall 34 in a radially outer edge area 36 of the first bottom wall 34. A porous evaporator medium 42 of, for example, a disk-like shape is provided on a front side 40 of the first bottom wall 34, which said front side is positioned or can be positioned such that it faces the combustion chamber 14. This porous evaporator medium may be designed as a knitted fabric, braiding, foamed ceramic, metal foam or the like, i.e., generally as a component or assembly unit with a pore-like structure, which guarantees the transportation of liquid fuel contained therein by capillary delivery action. The first circumferential wall 38 extends starting from the first bottom wall 34, for example, essentially in the direction of the longitudinal axis L on a rear side 44 of the first bottom wall 34, which said rear side is oriented opposite the front side 40, in the direction away from the porous evaporator medium 42 and hence also in the direction away from the combustion chamber 14 of the combustion chamber assembly unit 10.

In a central area of the first bottom wall 34, the latter has an opening, which is formed by a bend 46, into which opens a fuel feed line 50 in order to feed liquid fuel into the porous evaporator medium 42.

In the shape shown, i.e., with the essentially planar first bottom wall 34 designed, e.g., without fuel guide canals, with the essentially cylindrical first circumferential wall extending starting from it and with the bend 46 for providing the opening 48, the bottom part 32 may be manufactured, for example, from steel plate material in a deep-drawing operation in a simple manner and with high manufacturing precision. An essentially disk-shaped or ring disk-like blank can be punched out for this from a metal sheet and then brought to the desired shape in a deep-drawing operation. Further, e.g., machining operations are not necessary.

A first holding part generally designated by 52 has an essentially ring-like shape and comprises a second circumferential wall 54 extending essentially in the direction of the longitudinal axis L. The second circumferential wall 54 passes over into an essentially radially inwardly curved contact area 56 in one of its axial end areas. The first holding part 52 is curved in this contact area 56 in the direction of the side 58 of the porous evaporator medium 42 that is to be oriented such that it will face the combustion chamber 14. In the other axial end area, the first holding part 52 is curved radially outwardly starting from the essentially cylindrically shaped second circumferential wall 54. A lead-in bevel is thus obtained, which can be embodied with a simple design and which makes it possible in a simple manner to push the first holding part 52 with its second circumferential wall 54 and the bottom part 32 with its first circumferential wall 38 over each other. The two circumferential walls 54, 38 are positioned during this pushing into one another such that they extend one over the other axially at least partially. The first holding part 52 can now be pushed over the bottom part 32 to the extent that the contact area 56 is pressed directly against the porous evaporator medium 42 in the radially outer edge area i.e., it touches this. An intermediate contact element, for example, a wick ring or the like, via which the contact area 56 would then touch the porous evaporator medium 42 and be pressed against the bottom part 32 or the first bottom wall 34, could be optionally provided here between the contact area 56 and the porous evaporator medium 42. The operation of pushing one over another may be a force-guided operation, i.e., it may last until a correspondingly great resistance to motion develops due to a corresponding contact force of the contact area 56 at the porous evaporator medium 42, or it can be moved away, i.e., continued until a certain, preset relative positioning of the first holding part 52 relative to the bottom part 32 is achieved.

The first holding part 52 may also be manufactured with the shape shown in FIG. 2 in a simple manner by deforming a ring disk-like sheet metal blank, preferably from steel plate. The dimensioning may be such that when the two circumferential walls 54, 38 are pushed one over the other, a press fit, which guarantees stable fixation of the first holding part 52 in relation to the bottom part 32 without additional fastening measures, is generated by press fit. As an alternative or in addition, this rigid connection may be generated by connection in substance, for example, welding.

The direct contact of the two circumferential walls 54, 38 with one another may be advantageously used for this to achieve the welding together of the two circumferential walls 54, 38 by means of a welding laser brought up from the radially outward direction. For example, a weld seam 62 extending about the longitudinal axis L in the circumferential direction can thus be generated. A plurality of weld areas or welding spots distributed over the circumference may, of course, also be generated, especially when a stable and liquid-tight connection of the two circumferential walls 54, 38 with one another has already also been generated by press fit.

The porous evaporator medium 42 is also pressed at the same time, especially in its radially outer edge area 60, against the bottom part 32 by the first holding part 52 and the bottom part 32 being pushed one over the other and due to the fact that contact of the contact area 56 with the porous evaporator medium 42 is also generated in the process. This can be used to fix the porous evaporator medium 42 to the bottom part 32 without further fastening measures. At the same time, the contact of the contact area 56 at the radially outer edge area 60 of the evaporator medium 42 may be used to prevent fuel that is discharged especially in the radially outwardly oriented end face area and collects there from flowing into the combustion chamber 14. Discharge of liquid fuel from the porous evaporator medium 42 in the direction of the combustion chamber 14 is thus possibly only at the area of the side 58 of the porous evaporator medium 42 that is exposed towards the combustion chamber 14. It should be noted that in addition to the fixing action of the contact area 56, the porous evaporator medium 42 may, of course, also be fixed by additional fastening measures acting directly between this medium and the bottom part 32. For example, the porous evaporator medium 42 could be connected to the bottom part 32 by soldering or by sintering.

A second holding part 64 is arranged opposite the rear side 44 of the first bottom wall 34 at an axially spaced location. This second holding part comprises a second bottom wall 66 positioned at an axially spaced location from the first bottom wall 34 as well as a third circumferential wall 70 extending in a radially outer edge area 68 away from the second bottom wall 66 essentially in the direction of the longitudinal axis L. This circumferential wall 70 is oriented such that it extends away from the first bottom wall 34 and thus also away from the porous evaporator medium 42 and thus in the same direction as the first circumferential wall 38. In a central area, the second holding part 34 has an opening 72, through which the fuel feed line 50 is led in the direction of the first bottom wall 34.

The second holding part 64 is advantageously also manufactured as a shaped sheet metal part, preferably from steel plate, in a deep-drawing operation, and is shaped such that it can be pushed with its third circumferential wall 70 into the bottom part 32, i.e., the first circumferential wall 38 extends axially over the third circumferential wall 70. The dimensioning may likewise be such here that the second holding part 64 is held in the bottom part 32 by press fit alone. As an alternative or in addition, it is possible to generate a weld seam 74 extending, for example, about the longitudinal axis L or a plurality of welded areas or welding spots following each other in the circumferential direction in this case as well, advantageously by laser welding.

The bottom part 32 and the second holding part 64 enclose a first mounting space 76 between them. This is defined in the axial direction essentially by the two bottom walls 34, 66 and is defined radially outwardly essentially by a section of the first circumferential wall 38. A heat-insulating material 78, which is formed, for example, with fiber material, e.g., ceramic nonwoven material or foamed material, and which advantageously fills the volume of the first mounting space 76 essentially completely and has a passage opening 80 for the fuel feed line 50 or the bend 46 of the bottom part 32 in the central area, may be arranged in this first mounting space 76.

The heat-insulating material 78, which may thus have an essentially ring disk-like shape, may be positioned such that it lies on the first bottom wall 34 before the second holding part 64 is pushed into the bottom part 32. The second holding part 64 with its third circumferential wall 70 is then pushed into the first circumferential wall 38 of the bottom part 32, i.e., until a sufficient force of reaction is generated by the heat-insulating material 78, or it is steered away, i.e., until a certain relative positioning of the second holding part 64 in relation to the bottom part 32 is achieved. If necessary, the rigid connection can be generated in this state by connection in substance, i.e., for example, by forming the weld seam 74.

By providing heat-insulating material 78 on the rear side 44 of the bottom wall 34, heat losses occurring in this direction and hence excessive cooling of the porous evaporator medium 42 are prevented from occurring, which increases the efficiency of combustion and reduces the necessary amount of energy introduced especially during the start phase of the combustion.

The bottom assembly unit 30 described in detail above with reference to FIG. 2 can be provided in a modular design adapted to different embodiments of a combustion chamber assembly unit 10. For example, the thickness of the porous evaporator medium 42 to be used can thus be varied in a simple manner, and so can the thickness of a heat-insulating material 78 that may possibly be provided. Such variations in thickness affect only the relative positioning of the bottom part 32 in relation to the first holding part 52 and of the second holding part 64 in relation to the bottom part 32. Since these welded areas, i.e., for example, the weld seams 62, 64, are positioned in different axial areas, especially when these different parts are also to be connected with one another in substance, for example, by welding, the arrangement of, for example, the second holding part 64 is not compromised by the connection of the bottom part 32 with the first holding part 52.

The bottom assembly unit 30 having such a design can be fixed after its assembly as a module to the combustion chamber circumferential wall 12. The holding part 52 with its second circumferential wall 54 is pushed to this end into the axial end area 28 of the combustion chamber circumferential wall 12. The dimensioning may also be such for this that a press fit, which guarantees stable fixation of the bottom assembly unit 30 to the combustion chamber circumferential wall 12, is already generated during this pushing in. The second circumferential wall 54 is advantageously also connected to the combustion chamber circumferential wall 22 by connection in substance, preferably welding, especially also to generate a tight sealing against the discharge of combustion waste gases. For example, a weld seam 82, which advantageously extends about the longitudinal axis L without interruptions, may in turn be generated for this. This may also advantageously be carried out by laser welding based on the fact that the areas to be welded together are located in a radially nested pattern. It is recognized in FIG. 1 that the weld seam 82 thus generated is also located axially offset in relation to the weld seams 62, 74 of the bottom assembly unit 30. It should be noted in this connection that the rigid connection of the flame diaphragm 20 to the combustion chamber circumferential wall 12 or the flame tube 16 and the connection of the mounting flange 26 to the combustion chamber circumferential wall 12 may also be embodied by welding, for example, laser welding, i.e., by generating weld seams 84, 86 or individual welded areas or welding spots following each other in the circumferential direction.

FIGS. 3 through 6 show embodiment variants of bottom assembly units that can be used in the combustion chamber assembly unit 10 according to FIG. 1. Components that correspond to components already described above in terms of design or function are designated by the same reference numbers in these views. The differences existing from the above-described embodiment will be dealt with essentially below with reference to these FIGS. 3 through 6.

Figure 3:
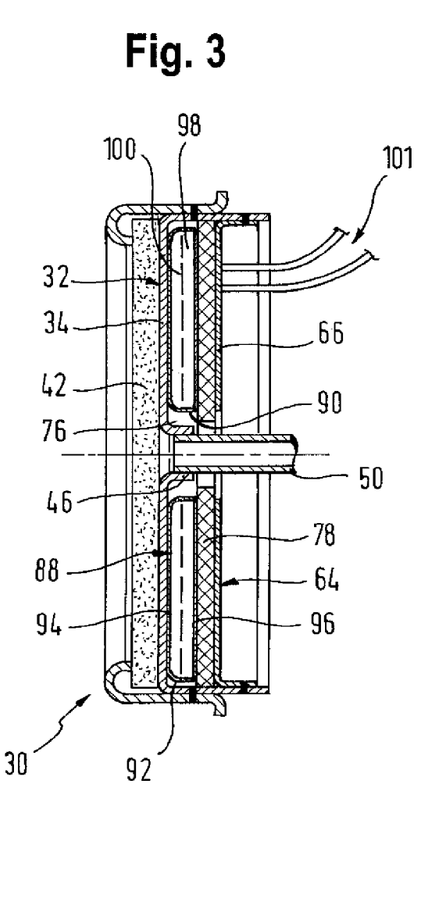
FIG. 3 is a view of a bottom assembly unit of an alternative design corresponding to FIG. 2.

FIG. 3 shows a bottom assembly unit 30, in which the above-described heat-insulating material 78, on the one hand, and a heating arrangement generally designated by 88, on the other hand, are arranged in an axially staggered pattern in the first mounting space 76 between the first bottom wall 34 and the second bottom wall 66. provided directly adjacent to the first bottom wall 34, while the heat-insulating material 78 is positioned on the side of the heating arrangement 88 facing away from the first bottom wall 34 and thus also adjacent to the second bottom wall 66, and it can thus guarantee thickness compensation.

Similarly to the heat-insulating material 78, the heating arrangement 88 is basically of a ring disk-shaped design as well and has in its central area an opening 90 for the passage of the fuel feed line 50 or of the bend 46. The heating arrangement 88 comprises a housing 92, which comprises a ring shell-like housing part 94 and a cover-like housing part 96 connected rigidly thereto, e.g., by crimping. These two housing parts 94, 96 enclose in an interior space 98 an electrically energizable heating element 100, which is indicated only generally and which can be electrically energized via supply lines. The electrically energizable heating element may be provided as an elongated heat conductor designed, for example, in a plate-like manner, but it may also comprise a heat conductor extending in a helical, coil-like, meandering or another manner. Especially if the housing parts 94, 96 are formed from metallic material, for example, sheet metal material, it is advantageous or necessary to arrange electrically insulating material, for example, in a plate-like configuration, between the electrically energizable heating element 100 and the two housing parts 94, 96 enclosing this in order to avoid an electric short circuit.

The design shown in FIG. 3 creates the possibility of heating the porous evaporator material 42 and thus to increase the rate of evaporation of fuel contained therein especially during a start phase by energizing the electrically energizable heating element 100 of the heating arrangement 88. Heat losses are reduced because the heat-insulating material 78 is provided in the first mounting space 76 at the same time on the side of the heating arrangement 88 facing away from the porous evaporator medium 42.

The axial extension of the first mounting space 76 for receiving both the heating arrangement 88 and the heat-insulating material 78 can be adapted in a simple manner by the second holding part 64 being inserted into the bottom part 32 only to the extent that the heat-insulating material 78 and the heating arrangement 88 are fixed axially, for example, under a slight axial pressure, and no further measures are thus necessary, either, to fix this heating arrangement in the first mounting space 76. As is shown especially by a comparison of FIG. 2 and FIG. 3, the second holding part 64, which may have a design identical to that of the second holding part 64 used in the embodiment according to FIG. 2, dips less deeply into the bottom part 32, which likewise has an identical design, in the embodiment variant shown in FIG. 3.

Figure 4:
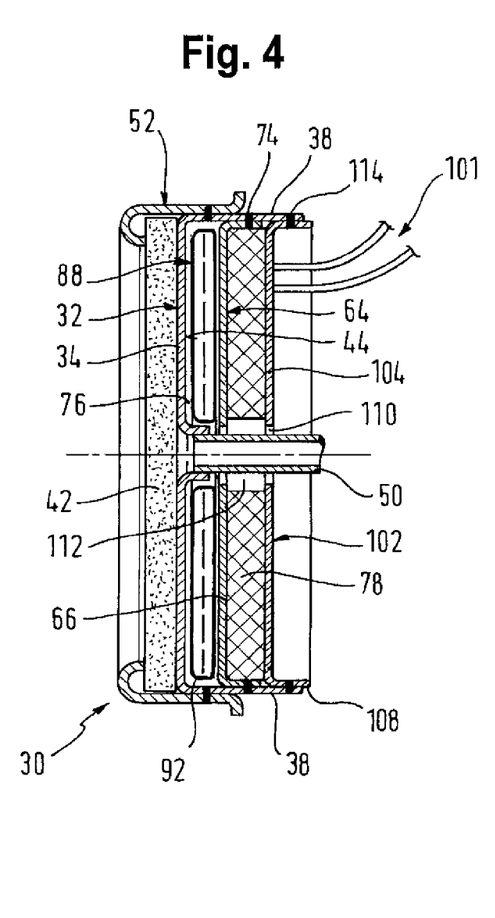
FIG. 4 is a view of a bottom assembly unit of an alternative design corresponding to FIG. 2.

FIG. 4 shows an embodiment variant in which a third holding part 102 is inserted into the bottom part 32 on the side of the second holding part 64 facing away from the first bottom part 34.

The third holding part 102 comprises a third bottom wall 104 and, in a radially outer area thereof adjacent to same, a fourth circumferential wall 108, which extends in the direction away from the bottom part 32. In its central area, the third bottom part 102 has an opening 110 for the passage of the fuel feed line 50. For example, the third holding part 102 may have a design identical to that of the second holding part 64, so that the number of components having different shapes can be kept low.

Together with the second holding part 64, the third holding part 102 defines a second mounting space 112, which follows the first mounting space 76 in the direction away from the first bottom wall 34. The heating arrangement 88 already mentioned above is provided in the first mounting space 76 in this embodiment. This heating arrangement can be energized via the lines 101. Respective passage openings must be provided to this end for these lines 101 in the two holding parts 64, 102. The heat-insulating material 78 is arranged in the second mounting space 112 between the second bottom wall 66 and the third bottom wall 104, so that this material is now positioned such that it is physically separated from the heating arrangement 88.

When assembling the bottom assembly unit 30 shown in FIG. 4, the heating arrangement 88 is positioned first on the rear side 44 of the first bottom wall 30, and the second housing part 64 is then pushed into the first outer circumferential wall 38 until the housing 92 of the heating arrangement 88 is held axially between the two bottom walls 34, 66, for example, with a slight press fit. The second holding part 64 can already be held in this state at the bottom part 32 with a press fit, and can be additionally fixed thereto by the weld seam 74. The heat-insulating material 78 is then positioned adjacent to the second bottom wall 66, and the third holding part 102 is inserted thereafter, for example, until it comes into contact with the second holding part 64 or/and the heat-insulating material 78 is compressed to the preset extent and is thus held between the second bottom wall 66 and the third wall 104. The holding part 102 can be held in this state by press fit in the first circumferential wall 38. As an alternative or in addition, fixation may be brought about by connection in substance, i.e., for example, welding. A weld seam 114 or a plurality of welded areas or welding spots following each other in the circumferential direction can be generated here as well, for example, by a laser welding operation. The welding together of the two holding parts 64, 102 may also be carried out in a common welding operation, i.e., after positioning both holding parts 64, 102 in the bottom part 32, especially if the two holding parts 64, 102 are also held by press fit in the first circumferential wall 38. Further, the first holding part 52 and with this also the porous evaporator medium 42 can be fixed only after insertion of the second holding part 64 or of the third holding part 102 at the bottom part in this and all other embodiments of the bottom assembly unit 30.

A further variation, which could be made in this embodiment as well as in the embodiments shown as well, provides for the bottom part 32 to have essentially the same shape as, for example, the second holding part 64 and also the third holding part 102, i.e., it does not surround these two holding parts 64, 102 with its first circumferential wall 38. The bottom part 32 and the second holding part 64, and possibly also the third holding part 102 could then be inserted into the first holding part 52 axially staggered behind the other, so that the second circumferential wall 54 of the first holding part 52 extends over the circumferential walls 38, 70, 108 of the bottom part 32 and of the holding parts 64, 102 on their outer side and is thus connected by both press fit and welding.

Figure 5:
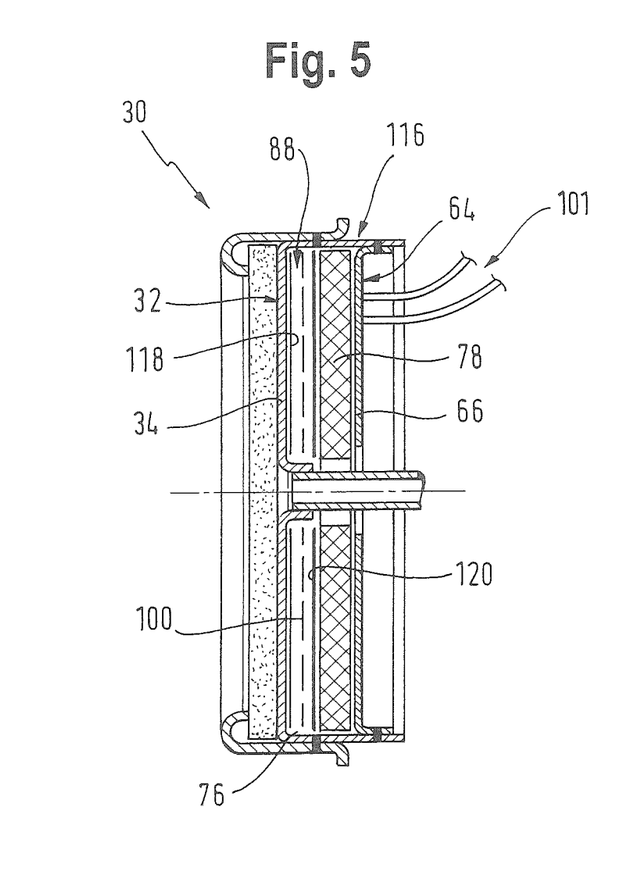
FIG. 5 is a view of a bottom assembly unit of an alternative design corresponding to FIG. 2.
Figure 6:
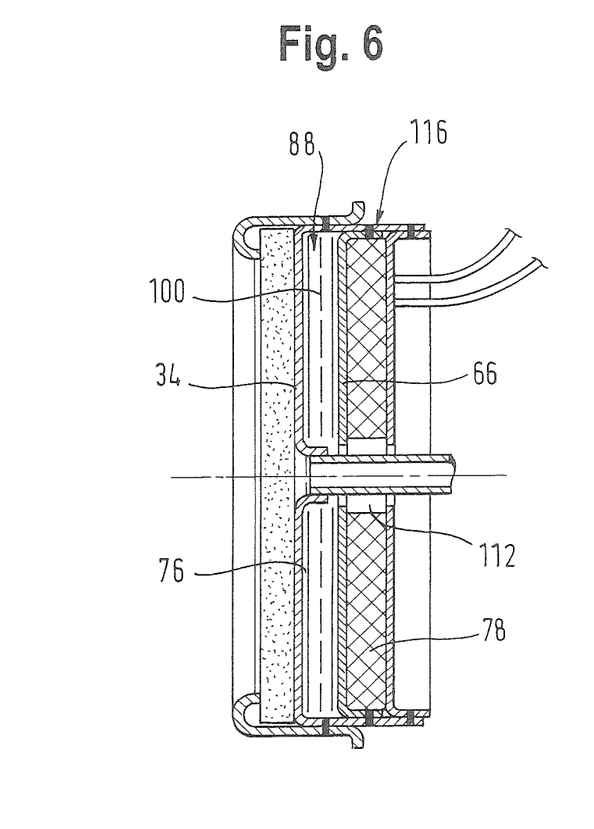
FIG. 6 is a view of a bottom assembly unit of an alternative design corresponding to FIG. 2.

FIG. 5 shows an embodiment of a bottom assembly unit 30, in which the heating arrangement 88 is inserted into the first mounting space without the provision of an additional housing, as it can be recognized in FIGS. 3 and 4, together with the heat-insulating material 78. This means that the bottom part 32 and the second holding part 64 essentially also provide a heating arrangement housing 116. The electrically energizable heating element 100 is thus located freely between the two bottom walls 34, 66. To prevent an electric short circuit, a single-layer or multilayer electrically insulating material 118 of, for example, a plate-like or sheet-like design is located between the electrically energizable heating element 100 and the first bottom wall 34. At least one or more layers of an insulating material 120 having, for example, a plate-like or sheet-like design may likewise be provided on the side of the electrically energizable heating element 100 facing away from the first bottom wall 34, and this material 120 may be followed by the heat-insulating material 78. If this heat-insulating material 78 is also an electrically insulating material and has a sufficient thermal loadability, this may also be positioned directly adjacent to the electrically energizable heating element 100, omitting the electrically insulating material 120.

To achieve stable positioning of the heating arrangement 88 in the heating arrangement housing 116 provided by the housing part 32 and the second holding part 64, the second holding part 64 may be inserted into the bottom part 32 so deeply that the individual components of the heating arrangement 38 arranged in a layer-like manner as well as the heat-insulating material 78 are held axially between the bottom walls 34, 66.

For example, artificial mica material, e.g., Micanite, may be used as the electrically insulating material 118, 120. The electrically insulating material 118 between the electrically energizable heating element 100 and the first bottom wall 34 may have a thickness of, for example, up to about 0.5 mm. The electrically insulating material 120 on the side of the electrically energizable heating element 100 facing away from the first bottom wall 34 may likewise be formed from artificial mica material, e.g., Micanite, and have a thickness of up to 1 mm. As a result, this electrically insulating material 120 may also provide at the same time the functionality for heat insulation and be provided instead of the heat-insulating material 78 and may be positioned in this case directly adjacent to the second bottom wall 66 of the second holding part 64.

The embodiment shown in FIG. 6 uses again two mounting spaces 76, 112 following each other axially. The heating arrangement 88 having the design described above with reference to FIG. 5 is positioned in the first mounting space 76 located directly adjacent to the first bottom wall 34 and is held between the first bottom wall 34 and the second bottom wall 66. The heat-insulating material 78 is arranged in the second mounting space 112 then following, so that this is now separated physically from the heating arrangement 88 by the second bottom wall 66.

The above-described design of a combustion chamber assembly unit 10 and of the bottom assembly unit 30 that can be used therefor creates the possibility of using, adapted to different requirements, for example, porous evaporator media having different thicknesses in a simple manner and utilizing the modular character, of adapting the axial positioning of the bottom assembly unit 30 in the combustion chamber circumferential wall 12 as well as of providing a heating arrangement and of arranging same in a defined positioning in a mounting space provided therefor, which applies equally to the heat-insulating material to be provided as well. It is thus also possible, in particular, to design the evaporator assembly unit 10 adapted to use with different types of fuel, i.e., for example, gasoline or diesel fuel. This is carried out with the use of system components that can be manufactured with a simple construction, because all carrying components, i.e., the bottom part 32 as well as the holding parts 52, 64 and 102 can be manufactured essentially as shaped sheet metal parts preferably in a deep-drawing operation and can likewise be connected with one another and also with the combustion chamber circumferential wall in a simple and stable manner.

Improved heat coupling into the porous evaporator medium is guaranteed during energization of the electrically energizable heating element 100 due to the possibility of omitting a separate housing of the heating arrangement and of using, instead, the bottom part 32 and the second holding part 64 that follows same or is inserted into this as a heating arrangement housing 116. Further, the necessary installation space and weight can be reduced and also costs can be saved due to the possibility of omitting a separate housing of the heating arrangement. At the same time the heating surface that can be used for the electrically energizable heating element 100 can be enlarged, because this heating element 100 can extend radially on the outside nearly up to the first circumferential wall 38, so that the heat output can also be increased, in principle. The individual components of the heating arrangement are advantageously designed as independent components, i.e., not as printed or printable elements.

An ignition element generally designated by 121 is provided associated with the combustion chamber assembly unit 10 in FIG. 1. This ignition element 121, designed, for example, as a glow plug, passes through an ignition element passage opening 122 provided in the combustion chamber circumferential wall 12 and protrudes into the combustion chamber 14 with an igniting area 124, which can be heated when it is electrically energized. A head area 126 of the ignition element 121, positioned outside the combustion chamber 14, i.e., on the outer side 24 of the combustion chamber circumferential wall 12, is fixed in an ignition element holder 128, which will be explained in detail below. The igniting area 124 of the ignition element 121 extends into the combustion chamber 14 preferably essentially at right angles to the longitudinal axis L, so that this area 124 is positioned essentially in parallel to and at a defined spaced location from the side 58 of the porous evaporator medium 42 located facing the combustion chamber 14. Due to the above-described variability of the depth of fitting of the first holding part 52 into the circumferential wall 12, the axial distance of the ignition element 121 or of the igniting area 124 from the porous evaporator medium 42 can be, for example, adapted to different types of fuels to be used.

The ignition element holder 128 is advantageously designed as a component separate from the combustion chamber circumferential wall 12 and is fixed on the outer side 24 of the combustion chamber circumferential wall 12 by connection in substance, for example, by welding, soldering or bonding. This also guarantees great accuracy in positioning the ignition element 120.

Figure 7:
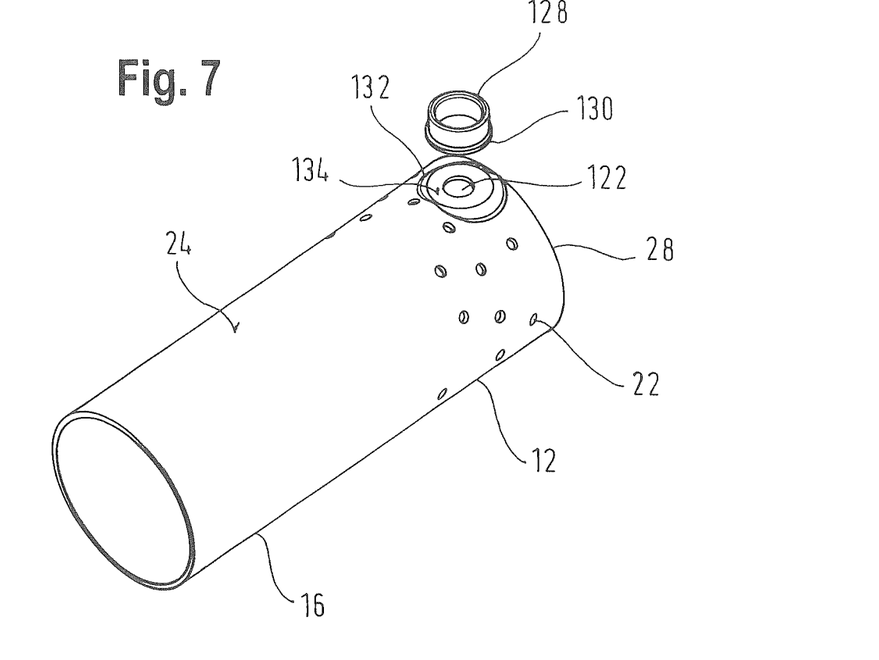
FIG. 7 is an essentially cylindrical combustion chamber circumferential wall with a flame tube made integrally with it and with an ignition element holder fixed on the outer side of the combustion chamber circumferential wall.

In the exemplary embodiment shown in FIG. 7, the ignition element holder 128 is designed with an essentially ring-like shape as a milled part, turned and milled part, turned part or metal injection molding or precision casting. A support edge area 130 thereof may be fixed on the outer side 24 of the combustion chamber circumferential wall 12. For example, an embossing 132 may be generated for this to generate an essentially planar, non-curved contact surface 134 on the combustion chamber circumferential wall 12, with which the support edge area 130 can be correspondingly in contact planarly and fixed in a stable manner. The ignition element 120 can then be inserted with its head area 126 into the correspondingly shaped contour of the ignition element holder 128 and locked therein, for example, by press fit, optionally additionally by bonding or the like. If the head area 126 is designed to fix the ignition element 120 with an external thread, an internal thread may be correspondingly provided on the inner side of the ignition element holder 128 having a ring-like design. The axial positioning of the ignition element 120 in relation to the combustion chamber circumferential wall 12 can be defined by the contact of the head area 126 on the outer side 24 of the combustion chamber circumferential wall 12.

Figure 8:
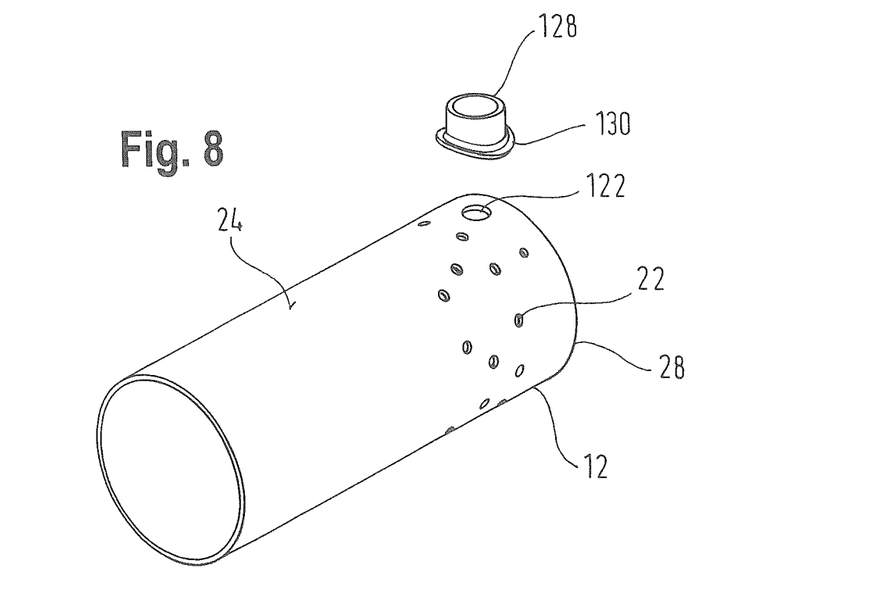
FIG. 8 is a view of an alternative embodiment corresponding to FIG. 7.

FIG. 8 shows an embodiment in which the ignition element holder 128 is also formed, for example, with the edge area 130 as a shaped sheet metal part. The edge area 130 is curved here adapted to the curved contour of the outer side 24 of the combustion chamber circumferential wall 12 and is located, surrounding the ignition element passage opening 122, on the outer side 24 or is rigidly connected therewith by welding or soldering or bonding.

Since the ignition element holder 128 is designed as a separate component that can be manufactured in a simple and cost-effective manner in the case of the combustion chamber assembly unit 10 shown especially also in reference to FIGS. 7 and 8, it is also possible to provide ignition element holders 128 having different shapes adapted to different ignition elements that are to be used. If, for example, an ignition element with a non-rotationally symmetrical contour of the head area 12 shall be used, a correspondingly shaped ignition element holder 128 can be used and fixed on the outer side 24 of the combustion chamber circumferential wall 12.

While specific embodiments of the invention have been shown and described in detail to illustrate the application of the principles of the invention, it will be understood that the invention may be embodied otherwise without departing from such principles.

What is claimed is:

1. A bottom assembly unit for a vaporizing burner combustion chamber assembly unit for a vehicle heater, the assembly unit comprising:
   a bottom part provided as a deep-drawn part from steel plate with a bottom part bottom wall having a front side and a rear side and with a bottom part circumferential wall extending from an outer edge area of the bottom part bottom wall essentially in a direction of a longitudinal axis of the bottom assembly unit;
   a porous evaporator medium covering the bottom part bottom wall in at least some areas on the front side of the bottom part bottom wall, which said front side is to be positioned such that said front side faces a combustion chamber; and
   a ring-shaped first holding part provided as a deep-drawn part from steel plate with a holding part circumferential wall and with a contact area provided, in at least some areas, by an end area of the holding part circumferential wall curved in the direction of a side of the porous evaporator medium, which said side of the porous evaporator medium is to be positioned such that said side of the porous evaporator medium faces a combustion chamber, for contacting the porous evaporator medium and pressing it against the front side of the bottom part bottom wall, wherein the bottom part circumferential wall extends, starting from the bottom part bottom wall on the rear side of the bottom part bottom wall, which said rear side is to be positioned such that said rear side faces away from a combustion chamber, in the direction away from the porous evaporator medium, and the holding part circumferential wall partially extends axially over the bottom part circumferential wall on an outer side thereof and is fixed to same.

2. A bottom assembly unit in accordance with claim 1, wherein the contact area is provided, in at least some areas, by a curved end area of the holding part circumferential wall.

3. A bottom assembly unit in accordance with claim 1, wherein the holding part circumferential wall is fixed to the bottom part circumferential wall by at least one of a press fit connection and a connection in substance.

4. A bottom assembly unit in accordance with claim 1, further comprising a second holding part provided on the rear side of the bottom part bottom wall, wherein the second holding part comprises a second bottom wall located axially opposite the bottom part bottom wall and a second holding part circumferential wall extending from a radially outer edge area of the second bottom wall essentially in the direction of the longitudinal axis away from the bottom part bottom wall, wherein at least one of the bottom part circumferential wall and the holding part circumferential wall extends axially at least partially over the second holding part circumferential wall on an outer side thereof and is fixed to same, and wherein a first mounting space is formed between the bottom part bottom wall and the second bottom wall.

5. A bottom assembly unit in accordance with claim 4, further comprising at least one of a heating arrangement and heat-insulating material arranged in the first mounting space.

6. A bottom assembly unit in accordance with claim 5, wherein the heating arrangement comprises a heating arrangement housing comprising the bottom part bottom wall and the second bottom wall.

7. A bottom assembly unit in accordance with claim 6, wherein the heating arrangement comprises an electrically conductive heating element and at least one layer of electrically insulating material between the electrically conductive heating element and at least one of the bottom part bottom wall and the second bottom wall.

8. A bottom assembly unit in accordance with claim 7, wherein heat-insulating material is arranged between the electrically conductive heating element and the second bottom wall.

9. A bottom assembly unit in accordance with claim 4, wherein at least one of the bottom part circumferential wall and the holding part circumferential wall is fixed to the second holding part circumferential wall by one of a press fit connection and a connection in substance.

10. A bottom assembly unit in accordance with claim 4, further comprising a third holding part provided on the rear side of the bottom part bottom wall, wherein the third holding part comprises a third bottom wall located axially opposite the second bottom wall and a third holding part circumferential wall extending from a radially outer edge area of the third bottom wall essentially in the direction of the longitudinal axis away from the second bottom wall, wherein at least one of the bottom part circumferential wall and the holding part circumferential wall and the second holding part circumferential wall extends axially at least partially over the third holding part circumferential wall on an outer side thereof and is fixed to same, and wherein a second mounting space is formed between the second bottom wall and the third bottom wall.

11. A bottom assembly unit in accordance with claim 10, wherein heat-insulating material is arranged in the second mounting space.

12. A bottom assembly unit in accordance with claim 10, wherein at least one of the bottom part circumferential wall and the holding part circumferential wall and the second holding part circumferential wall is fixed to the third holding part circumferential wall one of a press fit connection and a connection in substance.

13. A bottom assembly unit in accordance with claim 10, further comprising a fuel feed line opening in an area into the bottom part bottom wall, wherein the fuel feed line passes through at least one of an opening in the second bottom wall and an opening in the third bottom wall.

14. A bottom assembly unit in accordance with claim 10, wherein at least one of the bottom part, the first holding part, the second holding part and the third holding part is a deep-drawn part from steel plate.

15. A vaporizing burner combustion chamber assembly unit for a vehicle heater, the combustion chamber assembly unit comprising:
   a combustion chamber circumferential wall; and
   a bottom assembly unit comprising:
   a bottom part provided as a deep-drawn part from steel plate with a bottom part bottom wall having a front side and a rear side and with a bottom part circumferential wall extending from an outer edge area of the bottom part bottom wall essentially in a direction of a longitudinal axis of the bottom assembly unit;
   a porous evaporator medium covering the bottom part bottom wall in at least some areas on front side of the bottom part bottom wall, which said front side is to be positioned such that said front side faces a combustion chamber; and
   a ring-shaped first holding part provided as a deep-drawn part from steel plate with a holding part circumferential wall and with a contact area provided, in at least some areas, by an end area of the holding part circumferential wall curved in the direction of a side of the porous evaporator medium, which said side of the porous evaporator medium is to be positioned such that said side of the porous evaporator medium faces a combustion chamber, for contacting the porous evaporator medium and pressing it against the front side of the bottom part bottom wall, wherein the bottom part circumferential wall extends, starting from the bottom part bottom wall on a rear side of the bottom part bottom wall, which said rear side is to be positioned such that said rear side faces away from a combustion chamber, in the direction away from the porous evaporator medium, and the holding part circumferential wall partially extends axially over the bottom part circumferential wall on an outer side thereof and is fixed to same, wherein the combustion chamber circumferential wall extends axially at least partially over the holding part circumferential wall and is fixed to the holding part circumferential wall.

16. A combustion chamber assembly unit in accordance with claim 15, wherein the combustion chamber circumferential wall is fixed to the holding part circumferential wall by at least one of a press fit connection and a connection in substance.

17. A combustion chamber assembly unit assembly unit in accordance with claim 15, wherein a plurality of combustion air inlet openings are provided in the combustion chamber circumferential wall or/and that the combustion chamber circumferential wall is designed integrally with a flame tube.

18. A combustion chamber assembly unit assembly unit in accordance with claim 15, further comprising:
   an ignition element
   an ignition element holder, wherein:
   an ignition element passage opening is provided in the combustion chamber circumferential wall; and
   the ignition element holder is provided on an outer side of the combustion chamber circumferential wall for holding the ignition element positioned such that the ignition element protrudes into a combustion chamber through the ignition element passage opening.

19. A combustion chamber assembly unit assembly unit in accordance with claim 18, wherein the ignition element holder is fixed to the combustion chamber circumferential wall by at least one of a weld or a solder or a bond connection in substance.

20. A combustion chamber assembly unit in accordance with claim 18, wherein a part of the ignition element protruding into a combustion chamber surrounded by the combustion chamber circumferential wall extends essentially in parallel to a side of the porous evaporator medium facing the combustion chamber.

\* \* \* \* \*

UNITED STATES PATENT AND TRADEMARK OFFICE
CERTIFICATE OF CORRECTION

PATENT NO. : 9,857,081 B2
APPLICATION NO. : 14/511447
DATED : January 2, 2018
INVENTOR(S) : Collmer et al.

It is certified that error appears in the above-identified patent and that said Letters Patent is hereby corrected as shown below:

On the Title Page

Item (72) Inventor is corrected to read:
-- Andreas Collmer, Aichwald (DE);
Axel Kouril, Salach (DE);
Uwe Grotstollen, Esslingen (DE);
Lars Bendix, Schorndorf-Weiler (DE);
Oliver Roppelt, Deizisau (DE);
Marcus Heim, Kornwestheim (DE);
Michael Haefner, Stuttgart (DE);
Andreas Alber, Stuttgart (DE);
Andreas Wetzl, Wernau (DE);
Oliver Sauter, Ostfildern (DE);
Christoph Köberle, Fellbach (DE);
Jörg Zweckbronner, Kuchen (DE);
Frank Rudolf, Stuttgart (DE);
Dieter Heybach, Hochdorf (DE);
Ulrich Ludwig, Schorndorf (DE) --.

Signed and Sealed this
Fourth Day of June, 2019

Andrei Iancu
*Director of the United States Patent and Trademark Office*